(12) United States Patent
Nakagawa et al.

(10) Patent No.: US 8,598,098 B2
(45) Date of Patent: Dec. 3, 2013

(54) LUBRICANT COMPOSITION

(75) Inventors: Akira Nakagawa, Sagamihara (JP); Yutaka Mabuchi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 469 days.

(21) Appl. No.: 12/019,426

(22) Filed: Jan. 24, 2008

(65) Prior Publication Data

US 2008/0248979 A1 Oct. 9, 2008

(30) Foreign Application Priority Data

Jan. 26, 2007 (JP) ................................. 2007-015796

(51) Int. Cl.
*C10M 125/02* (2006.01)

(52) U.S. Cl.
USPC .......................................... 508/128; 508/130

(58) Field of Classification Search
USPC ................. 508/110, 113, 128, 233, 525, 130; 514/406; 510/421
See application file for complete search history.

(56) References Cited

U.S. PATENT DOCUMENTS

| | | | | |
|---|---|---|---|---|
| 4,120,803 | A | * | 10/1978 | Malec ............................. 508/233 |
| 2002/0137656 | A1 | * | 9/2002 | Blything et al. ............... 510/421 |
| 2003/0134758 | A1 | * | 7/2003 | Bovington et al. ............ 508/525 |
| 2004/0077505 | A1 | * | 4/2004 | Daniel et al. ................... 508/110 |
| 2004/0206491 | A1 | | 10/2004 | Davidson et al. |
| 2006/0040832 | A1 | | 2/2006 | Zhang et al. |
| 2006/0235066 | A1 | * | 10/2006 | Morinaga et al. .............. 514/406 |

FOREIGN PATENT DOCUMENTS

| | | |
|---|---|---|
| CN | 1696258 A | 11/2005 |
| CN | 1286957 C | 11/2006 |
| JP | 8-020786 A | 1/1996 |
| JP | 8-503009 | 4/1996 |
| JP | 2005-097375 | 4/2005 |
| JP | 2006-241443 | 9/2006 |
| WO | WO 94/10694 | 5/1994 |

OTHER PUBLICATIONS

"Standard Test Method for Separation of Representative Aromatics and Nonaromatics Fractions of High-Boiling Oils by Elution Chromatography," American Society for Testing and Materials (ASTM), Designation: D 2549-91 (Re-approved 1995), pp. 895-900.
Japanese Industrial Standard, "High carbon chromium bearing steels," JIS G 4805, 1999, pp. 1-32.
V. E. Red'kin, "Lubricants with Ultradisperse Diamond-Graphite Powder," Chemistry and Technology of Fuels and Oils, vol. 40, No. 3, Mar. 2004, pp. 164-170.
Yu-lin Qiao et al., "High temperature tribological behaviors of nano-diamond as oil additive,". Journal of Central South University of Technology, vol. 12, No. 2, Oct. 2005, pp. 181-185.
Office Action Japanese Application No. 2007-015796 dated Jun. 11, 2012.

* cited by examiner

*Primary Examiner* — James Goloboy
*Assistant Examiner* — Chantel Graham
(74) *Attorney, Agent, or Firm* — Foley & Lardner LLP

(57) ABSTRACT

A lubricant composition applicable to a sliding section or sliding member of an automotive internal combustion engine or power transmission apparatus to significantly lower a friction coefficient. The lubricant composition contains a base oil for a lubricating oil, an oxygen-containing organic compound, a diamond nano-particle and a dispersant for the diamond nano-particle.

16 Claims, No Drawings

LUBRICANT COMPOSITION

BACKGROUND OF THE INVENTION

This invention relates to improvements in a lubricant composition, and more particularly to the lubricant composition containing diamond nano-particles, applicable to a sliding section or sliding member of an automotive internal combustion engine or power transmission apparatus to significantly lower a friction coefficient.

Global environmental problems such as global warming and ozone depletion are coming to the fore. As it has been said that the global warming is significantly affected by $CO_2$ emission, and therefore reduction of $CO_2$ emission has become a big concern to us. To enhance vehicle fuel economy in order to reduce $CO_2$ emission is one of contributions to such problems. Therefore, the development in various technologies has been advanced, for example, a technology of reducing mechanical loss of an internal combustion engine.

There are proposed the following approaches to reduce mechanical loss due to a lubricating oil (or lubricant): (1) lowering the viscosity of the lubricating oil, thereby reducing viscous resistance in hydrodynamic lubrication regions and agitation resistance in the engine; and (2) adding a suitable friction modifier and other various additives into the lubricating oil, thereby reducing friction losses under the conditions of mixed and boundary lubrication. In view of the foregoing, many studies have been made on various friction modifiers mainly including organic molybdenum compounds such as molybdenum dithiocarbamate (MoDTC) and molybdenum dithiophosphate (MoDTP). There are disclosed in Japanese Patent Provisional Publication No. 8-20786, one of the above-mentioned studies, to employ a lubricant that contains an organic molybdenum compound imparting an excellent low-friction coefficient to conventional steel sliding members in the early stage of usage, which successfully provides a friction reducing effect to a certain extent.

SUMMARY OF THE INVENTION

However, drawbacks have been encountered in the above conventional techniques.

For example, the effect of the lubricant disclosed in Japanese Patent Provisional Publication No. 8-20786 is not enough for a recently required further improvement in fuel economy.

In view of the above, an object of the present invention is to provide an improved lubricant composition which can effectively overcome drawbacks encountered in conventional lubricant composition.

Another object of the present invention is to provide an improved lubricant composition that can effectively lower a friction coefficient thereby achieving the further improvement in fuel economy.

An aspect of the present invention resides in a lubricant composition comprising: a base oil for a lubricating oil; an oxygen-containing organic compound; a diamond nano-particle; and a dispersant for the diamond nano-particle.

DETAILED DESCRIPTION OF THE INVENTION

The present invention will be discussed below in detail. In the following description, all percentages (%) are by mass unless otherwise specified.

As has been discussed above, a lubricant composition according to the present invention includes a base oil for lubricating oil, an oxygen-containing organic compound, diamond nano-particles, and a dispersant for the diamond nano-particles, in which the diamond nano-particles are dispersed by the dispersant for the diamond nano-particles so as to exert an effect in synergy with the oxygen-containing organic compound. More specifically, the lubricant composition according to the present invention can achieve large reduction in friction coefficient and improvement in fuel economy, for example, when applied to a sliding section or sliding member of an automotive internal combustion engine or power transmission apparatus.

Further, the lubricant composition has a spillover advantage where it is not necessary to make a special surface treatment on a structural member to which the lubricant composition is applied, such as steel and an aluminium alloy.

The base oil for lubricating oil serves as a main component of the lubricant composition and preferably contains either one of mineral oil and synthetic oil that have a specific property, or both thereof.

Specific examples of the base oil of mineral type include paraffin-rich oil, naphthene-rich oil and normal paraffin, which are produced in such a manner as to purify a lubricant fraction of crude oil by combining at least one of purification treatment such as solvent deasphalting, solvent extraction, hydrogenolysis, solvent dewaxing, hydrogenating purification, wax isomerization, sulfuric acid treatment and clay refining. The lubricant fraction of crude oil is obtained by normal pressure distillation and reduced pressure distillation.

Specific examples of the base oil of synthetic type include: an alkylnaphthalene, an alkylbenzene, a polybutene and a hydrogenated product thereof; a poly-α-olefin such as a 1-octene oligomer and a 1-decene oligomer, and a hydrogenated product thereof; diesters of ditridecyl glutarate, dioctyl adipate, diisodecyl adipate, ditridecyl adipate, dioctyl sebacate or the like; polyol esters of trimethylolpropane caprylate, trimethylolpropane pelargonate, pentaerythritol-2-ethylhexanoate, pentaerythritol pelargonate or the like; and a mixture thereof.

In addition to the use of the lubricating oil base oil of mineral type or synthetic type either singly or as a mixture, it is also possible to use a mixture of two or more kinds of the base oil of mineral type or synthetic type. The mixing ratio of two or more kinds of the base oils contained in such a mixture is not particularly restricted and can be selected arbitrarily.

A total aromatic content of the lubricating oil base oil is not particularly restricted, but is preferably 15% or less, more preferably 10% or less and further preferably 8% or less. A total aromatic content in the lubricating oil base oil exceeding 15% results in an inferior stability to oxidation and therefore is undesirable.

A composition having a high friction reducing effect can be obtained even with a total aromatic content in the lubricating oil base oil of 2% or less, or even 0%, for example in a highly hydrogenolyzed mineral oil or in a hydrogenated product of 1-decene oligomer. In a case where the content of ashless fatty acid ester friction modifier exceeds 1%, it is preferable, if necessary, to regulate the total aromatic content (for example at 2% or higher) of the lubricating oil base oil by blending the lubricating oil base oil with a solvent purified mineral oil, an alkylbenzene or the like since the storage stability may be deteriorated.

The "total aromatic content" means a content of an aromatic fraction measured according to ASTM D 2549, and such aromatic fraction ordinarily contains: alkylbenzenes; alkylnaphthalenes; anthracene; phenanthrene; alkylated substances thereof; a compound in which four or more benzene rings are condensed; compounds containing heteroaromatic structure such as pyridines, quinolines, phenols and naphthols; and the like.

A total aromatic content in the lubricating oil base oil containing the poly-α-olefin-rich synthetic oil is preferably 5% or less, more preferably 3% or less, and much more preferably 2% or less.

The lubricating oil base oil is not particularly restricted in its kinematic viscosity, but in case of use as a lubricant composition for an internal combustion engine, a kinematic viscosity at 100° C. is preferably 2 $mm^2/s$ or higher, and more preferably 3 $mm^2/s$ or higher. Meanwhile, the kinematic viscosity is also preferably 20 $mm^2/s$ or less, more preferably 10 $mm^2/s$ or less and particularly preferably 8 $mm^2/s$ or less.

A lubricating oil base oil with a kinematic viscosity of 2 $mm^2/s$ or higher at 100° C. allows to obtain a composition capable of sufficient oil film formation, an excellent lubricating property and a smaller evaporation loss of the base oil under a high temperature condition. On the other hand, a kinematic viscosity of 20 $mm^2/s$ or less at 100° C. reduces a fluid resistance, thereby allowing obtaining a composition with a smaller frictional resistance in a lubricated site.

Further, a viscosity index of the lubricating oil base oil is not particularly restricted but is preferably 80 or higher, and, in case of use as a lubricant composition for an internal combustion engine, it is preferably 100 or higher, and particularly preferably 120 or higher. A lubricating oil base oil of a high viscosity index allows obtaining a lubricant composition excellent not only in a low-temperature viscosity characteristic but also in a friction reducing effect.

Concerning the oxygen-containing organic compound, it is not particularly restricted and can be any organic compound containing oxygen in the molecule. For example, it may be an oxygen-containing organic compound constituted of carbon, hydrogen and oxygen. The oxygen-containing organic compound may contain the other element than the above element, such as nitrogen, sulfur, halogen (fluorine, chlorine etc.), phosphorus, boron, a metal or the like, in the molecule.

Particularly in view of further reducing the friction in the sliding surface site defined by the sliding members, there is preferred an oxygen-containing organic compound which is constituted of carbon, hydrogen and oxygen and has a hydroxyl group, or a derivative of such an oxygen-containing organic compound.

Additionally, it is more preferred that the oxygen-containing organic compound has two or more hydroxyl groups.

Also for the same reason as the above, there is more preferred an oxygen-containing organic compound with a low sulfur content or free from sulfur.

A "derivative" discussed in this specification is not particularly restricted and can be, for example, a compound obtained by reacting an oxygen-containing organic compound constituted of carbon, hydrogen and oxygen with a nitrogen-containing compound, a phosphorus-containing compound, sulfur, a sulfur-containing compound, a boron-containing compound, a halogen element, a halogen-containing compound, a metal element, a metal-containing compound (organic or inorganic), or the like.

More specific examples of the oxygen-containing organic compound include: alcohols (I); carboxylic acids (II); esters (III); ethers (IV); ketones (V); aldehydes (VI); carbonates (VII); derivatives thereof; and an arbitrary mixture thereof.

The above-mentioned alcohols (I) are organic oxygen-containing compounds represented by the following general formula (1):

$$R-(OH)_n \quad (1)$$

and are exemplified by a compound having one or more hydroxyl groups.

The above-mentioned alcohols (I) are specifically exemplified by: monohydric alcohols (I-1); dihydric alcohols (I-2); tri- and higher polyhydric alcohols (I-3); alkylene oxide adducts (I-4) of alcohols selected from the above alcohols of three types; and mixtures (I-5) of one or more selected from the above (I-1) to (I-4).

The above-mentioned monohydric alcohols (I-1) have one hydroxyl group in the molecule, and include, for example: monohydric alkyl alcohols having from 1 to 40 carbon atoms (in which the alkyl group may be linear or branched) such as methanol, ethanol, propanol (1-propanol, 2-propanol), butanol (1-butanol, 2-butanol, 2-methyl-1-propanol, 2-methyl-2-propanol), pentanol (1-pentanol, 2-pentanol, 3-pentanol, 2-methyl-1-butanol, 3-methyl-1-butanol, 3-methyl-2-butanol, 2-methyl-2-butanol, 2,2-dimethyl-1-propanol), hexanol (1-hexanol, 2-hexanol, 3-hexanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 2,3-dimethyl-1-butanol, 2,3-dimethyl-2-butanol, 3,3-dimethyl-1-butanol, 3,3-dimethyl-2-butanol, 2-ethyl-1-butanol, 2,2-dimethylbutanol), heptanol (1-heptanol, 2-heptanol, 3-heptanol, 2-methyl-1-hexanol, 2-methyl-2-hexanol, 2-methyl-3-hexanol, 5-methyl-2-hexanol, 3-ethyl-3-pentanol, 2,2-dimethyl-3-pentanol, 2,3-dimethyl-3-pentanol, 2,4-dimethyl-3-pentanol, 4,4-dimethyl-2-pentanol, 3-methyl-1-hexanol, 4-methyl-1-hexanol, 5-methyl-1-hexanol, 2-ethylpentanol), octanol (1-octanol, 2-octanol, 3-octanol, 4-methyl-3-heptanol, 6-methyl-2-heptanol, 2-ethyl-1-hexanol, 2-propyl-1-pentanol, 2,4,4-trimethyl-1-pentanol, 3,5-dimethyl-1-hexanol, 2-methyl-1-heptanol, 2,2-dimethyl-1-hexanol), nonanol (1-nonanol, 2-nonanol, 3,5,5-trimethyl-1-hexanol, 2,6-dimethyl-4-heptanol, 3-ethyl-2,2-dimethyl-3-pentanol, 5-methyloctanol, etc.), decanol (1-decanol, 2-decanol, 4-decanol, 3,7-dimethyl-1-octanol, 2,4,6-trimethylheptanol, etc.), undecanol, dodecanol, tridecanol, tetradecanol, pentadecanol, hexadecanol, heptadecanol, octadecanol (stearyl alcohol, etc.), nonadecanol, eicosanol, heneicosanol, tricosanol, tetracosanol; monohydric alkenyl alcohols having from 2 to 40 carbon atoms (in which the alkenyl group may be linear or branched, and the double bond may be in any desired position) such as ethenol, propenol, butenol, hexenol, octenol, decenol, dodecenol, octadecenol (oleyl alcohol, etc.); monohydric (alkyl)cycloalkyl alcohols having from 3 to 40 carbon atoms (in which the alkyl group may be linear or branched, and the alkyl group and the hydroxyl group may be in any desired position) such as cyclopentanol, cyclohexanol, cycloheptanol, cyclooctanol, methylcyclopentanol, methylcyclohexanol, dimethylcyclohexanol, ethylcyclohexanol, propylcyclohexanol, butylcyclohexanol, dimethylcyclohexanol, cyclopentylmethanol, cyclohexylmethanol (1-cyclohexylethanol, 2-cyclohexylethanol, etc.), cyclohexylethanol, cyclohexylpropanol (3-cyclohexylpropanol, etc.), cyclohexylbutanol (4-cyclohexylbutanol, etc.) butylcyclohexanol, 3,3,5,5-tetramethylcyclohexanol; (alkyl)aryl alcohols (in which the alkyl group may be linear or branched, and the alkyl group and the hydroxyl group may be in any desired position) such as phenyl alcohol, methylphenyl alcohol (o-cresol, m-cresol, p-cresol), creosol, ethylphenyl alcohol, propylphenyl alcohol, butylphenyl alcohol, butylmethylphenyl alcohol (3-methyl-6-tert-butylphenyl alcohol, etc.), dimethylphenyl alcohol, diethylphenyl alcohol, dibutylphenyl alcohol (2,6-di-tert-butylphenyl alcohol, 2,4-di-tert-butylphenyl alcohol, etc.), dibutylmethylphenyl alcohol (2,6-di-tert-butyl-4-methylphenyl alcohol, etc.), dibutylethylphenyl alcohol (2,6-ditert-butyl-4-ethylphenyl alcohol, etc.), tributylphenyl alcohol (2,4,6-tri-tert-butylphenyl alcohol, etc.), naphthol (α-naphthol, β-naphthol, etc.), dibutylnaphthol (2,4-di-tert-butyl-α-naphthol, etc.); 6-(4-oxy-3,5-di-tert-butylanilino)-2,4-bis(n-octylthio)-1,3,5-triazine; and their mixtures.

Of these monohydric alcohols, more preferred are linear or branched alkyl or alkenyl alcohols having from 12 to 18 carbon atoms, such as oleyl alcohol and stearyl alcohol, in that they may more effectively lower the friction between the sliding member A coated with the hard carbon (DLC) thin film and the sliding surface of any other material B and that they are poor in volatility to exhibit their friction-reducing effect even at high temperature conditions (for example, sliding condition in an internal combustion engine).

The above-mentioned dihydric alcohols (I-2) are concretely those having two hydroxyl groups in the molecule, and include, for example: alkyl or alkenyldiols having from 2 to 40 carbon atoms (in which the alkyl or alkenyl group may be linear or branched, the double bond of the alkenyl group may be in any desired position, and the hydroxyl group may also be in any desired position) such as ethylene glycol, diethylene glycol, polyethylene glycol, propylene glycol, dipropylene glycol, polypropylene glycol, neopentyl glycol, 1,3-propanediol, 1,4-butanediol, 1,2-butanediol, 2-methyl-1,3-propanediol, 1,5-pentanediol, 1,6-hexanediol, 2-ethyl-2-methyl-1,3-propanediol, 2-methyl-2,4-pentanediol, 1,7-heptanediol, 2-methyl-2-propyl-1,3-propanediol, 2,2-diethyl-1,3-propanediol, 1,8-octanediol, 1,9-nonanediol, 2-butyl-2-ethyl-1,3-propanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20-eicosadecanediol; (alkyl)cycloalkanediols (in which the alkyl group may be linear or branched, and the alkyl group and the hydroxyl group may be in any desired position) such as cyclohexanediol, methylcyclohexanediol; dihydric (alkyl)aryl alcohols having from 2 to 40 carbon atoms (in which the alkyl group may be linear or branched, and the alkyl group and the hydroxyl group may be in any desired position) such as benzenediol (catechol, etc.), methylbenzenediol, ethylbenzenediol, butylbenzenediol (p-tert-butylcatechol, etc.) dibutylbenzenediol (4,6-di-tert-butylresorcinol, etc.), 4,4'-thiobis(3-methyl-6-tert-butylphenol), 4,4'-butylidenebis(3-methyl-6-tert-butylphenol), 2,2'-methylenebis(4-methyl-6-tert-butylphenol), 2,2'-thiobis(4,6-di-tert-butylresorcinol), 2,2'-methylenebis(4-ethyl-6-tert-butylphenol), 4,4'-methylenebis(2,6-di-tert-butylphenol), 2,2'-(3,5-di-tert-butyl-4-hydroxy)propane, 4,4'-cyclohexylidenebis(2,6-di-tert-butylphenol); p-tert-butylphenol/formaldehyde condensate, p-tert-butylphenol/acetaldehyde condensate; and their mixtures.

Of these dihydric alcohols, preferred are ethylene glycol, propylene glycol, 1,4-butanediol, 1,5-pentanediol, neopentyl glycol, 1,6-hexanediol, 2-methyl-2,4-pentanediol, 2-ethyl-2-methyl-1,3-propanediol, 1,7-heptanediol, 1,8-octanediol, 1,9-nonanediol, 1,10-decanediol, 1,11-undecanediol, 1,12-dodecanediol or the like, in that they may more effectively lower the friction between the sliding member A coated with the hard carbon thin film and the sliding surface of any other material B. In addition, high-molecular-weight hindered alcohols having a molecular weight of at least 300, preferably at least 400, such as 2,6-di-tert-butyl-4-(3,5-di-tert-butyl-4-hydroxybenzyl)phenyl alcohol are also preferred in that they are hardly volatile even at high temperature conditions (for example, sliding condition in internal combustion engines) and are highly resistant to heat, and that they can well exhibit their friction-reducing effect and can impart excellent antioxidation stability to a lubricating oil.

Further, tri- and higher polyhydric alcohols (I-3) are concretely those having three or more hydroxyl groups. In general, tri- to deca-hydric alcohols, preferably tri- to hexa-hydric alcohols are used.

Specific examples of those are: glycerin; trimethylolalkanes such as trimethylolethane, trimethylolpropane, trimethylolbutane; as well as erythritol, pentaerythritol, 1,2,4-butanetriol, 1,3,5-pentanetriol, 1,2,6-hexanetriol, 1,2,3,4-butanetetrol, sorbitol, adonitol, arabitol, xylitol, mannitol; and their polymers or condensates (e.g., glycerin dimers to octamers such as diglycerin, triglycerin, tetraglycerin; trimethylolpropane dimers to octamers such as ditrimethylolpropane; pentaerythritol dimers to tetramers such as dipentaerythritol; sorbitan; condensates such as sorbitol/glycerin condensate (including intramolecular condensates, intermolecular condensates, and self-condensates)).

Additionally, saccharides such as xylose, arabitol, ribose, rhamnose, glucose, fructose, galactose, mannose, sorbose, cellobiose, maltose, isomaltose, trehalose and sucrose are also usable.

Of these tri- and higher polyhydric alcohols, preferred are tri- to hexa-hydric alcohols such as glycerin, trimethylolalkanes (e.g., trimethylolethane, trimethylolpropane, trimethylolbutane), pentaerythritol, 1,2,4-butanetriol, 1,3,5-pentanetriol, 1,2,6-hexanetriol, 1,2,3,4-butanetetrol, sorbitol, sorbitol/glycerin condensate, adonitol, arabitol, xylitol, mannitol, and their mixtures. More preferred are glycerin, trimethylolethane, trimethylolpropane, pentaerythritol, sorbitan and their mixtures. Further, preferred are polyhydric alcohols having an oxygen content of at least 20%, more preferably at least 30%, much more preferably at least 40%.

Hexa- and higher polyhydric alcohols increase the viscosity of lubricating oil too much.

Furthermore, alkylene oxide adducts (I-4) includes alkylene oxide adducts of alcohols selected from (I-1) to (I-3). Concretely, they are prepared by adding an alkylene oxide having from 2 to 6, preferably from 2 to 4 carbon atoms or its polymer or copolymer to the alcohol to thereby hydrocarbyletherify or hydrocarbylesterify the hydroxyl group of the alcohol.

The alkylene oxide having from 2 to 6 carbon atoms includes ethylene oxide, propylene oxide, 1,2-epoxybutane (α-butylene oxide), 2,3-epoxybutane (β-butylene oxide), 1,2-epoxy-1-methylpropane, 1,2-epoxyheptane, 1,2-epoxyhexane.

Of those, preferred are ethylene oxide, propylene oxide and butylene oxide, in that they are more effective for reducing friction; and more preferred are ethylene oxide and propylene oxide.

When two or more kinds of alkylene oxides are used herein, the mode of oxyalkylene polymerization is not specifically restricted, and therefore the oxyalkylene groups may be random-copolymerized or block-copolymerized. When an alkylene oxide is added to a polyhydric alcohol having from 2 to 6 hydroxyl groups, it may be added to all of the hydroxyl groups or may be added to a part of the hydroxyl groups thereof.

The above-mentioned carboxylic acids (II) are oxygen-containing organic compounds represented by the following general formula (2):

$$R\text{—}(COOH)_n \qquad (2)$$

and are exemplified by a compound having one or more hydroxyl groups.

The above-mentioned carboxylic acids (II) are exemplified by: aliphatic monocarboxylic acids (fatty acids) (II-1); aliphatic polycarboxylic acids (II-2); carbocyclic carboxylic acids (II-3); heterocyclic carboxylic acids (II-4); and mixtures (II-5) of two or more selected from the above (II-1) to (II-4).

The above-mentioned aliphatic monocarboxylic acids (fatty acids) (II-1) are concretely those having one carboxyl group in the molecule, and include: saturated aliphatic monocarboxylic acids having from 1 to 40 carbon atoms (in which the saturated aliphatic structure may be linear or branched) such as methanoic acid, ethanoic acid (acetic acid), propanoic acid (propionic acid), butanoic acid (butyric acid, isobutyric acid, etc.), pentanoic acid (valeric acid, isovaleric acid, pivalic acid, etc.), hexanoic acid (caproic acid, etc.), heptanoic acid, octanoic acid (caprylic acid, etc.), nonanoic acid (pelargonic acid, etc.), decanoic acid, undecanoic acid, dodecanoic acid (lauric acid, etc.), tridecanoic acid, tetradecanoic acid (myristic acid, etc.), pentadecanoic acid, hexadecanoic acid (palmitic acid, etc.), heptadecanoic acid, octadecanoic acid (stearic acid, etc.), nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid; and unsaturated aliphatic monocarboxylic acids having from 2 to 40 carbon atoms (in which the unsaturated aliphatic structure may be linear or branched, and the unsaturated bond may be in any desired position) such as propenoic acid (acrylic acid, etc.), propynoic acid (propiolic acid, etc.), butenoic acid (methacrylic acid, crotonic acid, isocrotonic acid, etc.), pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid (oleic acid, etc.), nonadecenoic acid, eicosenoic acid, heneicosenoic acid, docosenoic acid, tricosenoic acid, tetracosenoic acid, pentacosenoic acid, hexacosenoic acid, heptacosenoic acid, octacosenoic acid, nonacosenoic acid, triacontenoic acid.

The above-mentioned aliphatic polycarboxylic acids (II-2) include: saturated or unsaturated aliphatic dicarboxylic acids having from 2 to 40 carbon atoms (in which the saturated aliphatic or unsaturated aliphatic structure may be linear or branched, and the unsaturated bond may be in any desired position) such as ethanedioic acid (oxalic acid), propanedioic acid (malonic acid, etc.), butanedioic acid (succinic acid, methylmalonic acid, etc.), pentanedioic acid (glutaric acid, ethylmalonic acid, etc.), hexanedioic acid (adipic acid, etc.), heptanedioic acid (pimelic acid, etc.), octanedioic acid (suberic acid, etc.), nonanedioic acid (azelaic acid, etc.), decanedioic acid (sebacic acid, etc.), propenedioic acid, butenedioic acid (maleic acid, fumaric acid, etc.), pentenedioic acid (citraconic acid, mesaconic acid, etc.), hexenedioic acid, heptenedioic acid, octenedioic acid, nonenedioic acid, decenedioic acid; saturated or unsaturated tricarboxylic acids (in which the saturated aliphatic or unsaturated aliphatic structure may be linear or branched, and the unsaturated bond may be in any desired position) such as propane-tricarboxylic acid, butane-tricarboxylic acid, pentane-tricarboxylic acid, hexane-tricarboxylic acid, heptane-tricarboxylic acid, octane-tricarboxylic acid, nonane-tricarboxylic acid, decane-tricarboxylic acid; and saturated or unsaturated tetracarboxylic acids (in which the saturated aliphatic or unsaturated aliphatic structure may be linear or branched, and the unsaturated bond may be in any desired position).

Further, the above-mentioned carbocyclic carboxylic acids (II-3) are concretely carboxylic acids having one or more carboxyl groups in the carbocyclic molecule, and include: carbocyclic carboxylic acids, or naphthene ring-having, mono, di, tri or tetracarboxylic acids, having from 3 to 40 carbon atoms (in which the alkyl or alkenyl group, if any therein, may be linear or branched, and the double bond, if any therein, may be in any desired position, and the number and the position of the substituents are not defined) such as cyclohexane-monocarboxylic acid, methylcyclohexane-monocarboxylic acid, ethylcyclohexane-monocarboxylic acid, propylcyclohexane-monocarboxylic acid, butylcyclohexane-monocarboxylic acid, pentylcycohexane-monocarboxylic acid, hexylcyclohexane-monocarboxylic acid, heptylcyclohexane-monocarboxylic acid, octylcyclohexane-monocarboxylic acid, cycloheptane-monocarboxylic acid, cyclooctane-monocarboxylic acid, trimethylcyclopentane-dicarboxylic acid (camphoric acid, etc.); aromatic monocarboxylic acids having from 7 to 40 carbon atoms, such as benzenecarboxylic acid (benzoic acid), methylbenzenecarboxylic acid (toluic acid, etc.), ethylbenzenecarboxylic acid, propylbenzenecarboxylic acid, benzenedicarboxylic acid (phthalic acid, isophthalic acid, terephthalic acid, etc.), benzenetricarboxylic acid (trimellitic acid, etc.), benzentetracarboxylic acid (pyromellitic acid, etc.), naphthalenecarboxylic acid (naphthoic acid, etc.); mono, di, tri or tetracarboxylic acids having an aryl group with from 7 to 40 carbon atoms (in which the alkyl or alkenyl group, if any therein as a substituent, may be linear or branched, and the double bound, if any therein, may be in any desired position, and the number and the position of the substituents are not defined) such as phenylpropanoic acid (hydroatropic acid), phenylpropenoic acid (atropic acid, cinnamic acid, etc.), salicylic acid, alkylsalicylic acid having one or more alkyl groups with from 1 to 30 carbon atoms.

The above-mentioned heterocyclic carboxylic acids (II-4) are concretely those having one or more carboxyl groups in the molecule, and include those having from 5 to 40 carbon atoms, such as furanecarboxylic acid, thiophenecarboxylic acid, pyridinecarboxylic acid (nicotinic acid, isonicotinic acid, etc.).

Then, the above-mentioned esters (III) are oxygen-containing organic compounds represented by the following general formula (3):

$$R-(COO-R')_n \tag{3}$$

and are exemplified by a compound having one or more ester bonds.

The above-mentioned esters (III) are specifically exemplified by: esters (III-1) of aliphatic monocarboxylic acids (fatty acids); esters (III-2) of aliphatic polycarboxylic acids; esters (III-3) of carbocyclic carboxylic acids; esters (III-4) of heterocyclic carboxylic acids; alkylene oxide adducts (III-5) of alcohols or esters; and mixtures (III-6) of any compounds selected from the above (III-1) to (III-5).

Esters of the above (III-1) to (III-5) may be complete esters in which the hydroxyl group and the carboxyl group are all esterified, or may be partial esters in which the hydroxyl groups or the carboxyl groups partially remain.

The above-mentioned esters (III-1) of aliphatic monocarboxylic acids (fatty acids) are exemplified by ester of one or more selected from the above-mentioned aliphatic monocarboxylic acids (II-1) and one or more selected from the above-mentioned mono, di, tri or higher polyhydric alcohols of (I-1) to (I-3), and it includes glycerin monooleate, glycerin dioleate, sorbitan monooleate, sorbitan dioleate, and the like.

In addition to the above, esters (III-1) are further exemplified by fatty acid esters having a linear or branched hydrocarbon group with from 1 to 5 or from 31 to 40 carbon atoms, and therefore include esters of fatty acids having such a hydrocarbon group and aliphatic monohydric alcohols or aliphatic polyhydric alcohols.

Of the above, those having a kinematic viscosity at 100° C. of from 1 to 100 mm$^2$/s may be used as the base oil for lubricating oil, and are generally distinguished from the fatty acid ester ashless friction modifier.

Their examples are polyol esters such as single esters or complex esters that are formed of tri or higher polyols having from 3 to 40, preferably from 4 to 18, more preferably from 4 to 12 carbon atoms, especially tri or higher polyols having a neopentyl structure, and one or more selected from monocarboxylic acids having from 1 to 40, preferably from 4 to 18, more preferably from 6 to 12 carbon atoms, and their mixtures, as well as their adducts with alkylene oxides added thereto, for example, trimethylolpropane caprylate, trimethylolpropane pelargonate, pentaerythritol-2-ethylhexanoate, pentaerythritol pelargonate.

These may be complete esters in which the hydroxyl groups or the carboxyl groups are all esterified, or partial esters in which the hydroxyl groups or the carboxyl groups partly remain. However, they are preferably complete esters generally having a hydroxyl value not more than 100 mg KOH/g, more preferably not more than 50 mg KOH/g, much more preferably not more than 10 mg KOH/g.

Additionally, the kinematic viscosity at 100° C. of the lubricating oil base oil is preferably from 2 to 60 mm$^2$/s, more preferably from 3 to 50 mm$^2$/s.

Then, the above-mentioned (III-2) esters of aliphatic polycarboxylic acids are exemplified by an ester of one or more selected from the above-mentioned aliphatic polycarboxylic acids (II-2) and one or more selected from the above-mentioned mono, di, tri or higher polyhydric alcohols (I-1) to (I-3).

Preferred examples of the esters (III-2) are diesters formed of one or more polycarboxylic acid selected from dicarboxylic acids having from 2 to 40, preferably from 4 to 18, more preferably from 6 to 12 carbon atoms, and one or more selected from monohydric alcohols having from 4 to 40, preferably from 4 to 18, more preferably from 6 to 14 carbon atoms, such as dibutyl maleate, ditridecyl glutarate, di-2-ethylhexyl adipate, diisodecyl adipate, ditridecyl adipate, di-2-ethylhexyl sebacate, and copolymers of these diesters (e.g., dibutyl maleate) and poly-α-olefins having from 4 to 16 carbon atoms; and esters of α-olefin adducts to acetic anhydride or the like, and alcohols having from 1 to 40 carbon atoms. Of these examples, those having a kinematic viscosity at 100° C. of from 1 to 100 mm$^2$/s may be used as the lubricating oil base oil.

The esters (III-3) of carbocyclic carboxylic acids are exemplified by an ester formed of one or more selected from carbocyclic carboxylic acids (II-3), and one or more selected from the mono, di, tri or higher polyhydric alcohols of (I-1) to (I-3).

Specific examples of esters (III-3) of carbocyclic carboxylic acids are aromatic carboxylic esters such as phthalic acid esters, trimellitic acid esters, pyromellitic acid esters and salicylic acid esters.

Of the above esters, those having a kinematic viscosity at 100° C. of from 1 to 100 mm$^2$/s may be used as the lubricating oil base oil.

Then, the esters (III-4) of heterocyclic carboxylic acids are exemplified by esters formed of one or more selected from the heterocyclic carboxylic acids of (II-4), and one or more selected from the mono, di, tri or higher polyhydric alcohols of (I-1) to (I-3).

Of the above esters, those having a kinematic viscosity at 100° C. of from 1 to 100 mm$^2$/s may be used as the lubricating oil base oil.

Then, the above-mentioned (III-5) alkylene oxide adducts of alcohols or esters are exemplified by: esters prepared by adding an alkylene oxide to one or more selected from the mono, di, tri or higher polyhydric alcohols of (I-1) to (I-3) followed by esterifying them; and adducts prepared by adding an alkylene oxide to the esters selected from (III-1) to (III-4).

Of the above compounds, those having a kinematic viscosity at 100° C. of from 1 to 100 mm$^2$/s may be used as the lubricating oil base oil.

The above-mentioned (IV) ethers are organic oxygen-containing compounds represented by the following general formula (4):

$$R\text{---}(O\text{---}R')_n \qquad (4)$$

and are exemplified by a compound having one or more ether bonds.

The ethers (IV) are specifically exemplified by: saturated or unsaturated aliphatic ethers (IV-1); aromatic ethers (IV-2); cyclic ethers (IV-3); mixtures (IV-4) of two or more selected from the above (IV-1) to (IV-3).

Specifically, the saturated or unsaturated aliphatic ethers (IV-1) are exemplified by those having from 2 to 40 carbon atoms (in which the saturated or unsaturated aliphatic structure may be linear or branched, and the unsaturated bond may be in any desired position), such as dimethyl ether, diethyl ether, di-n-propyl ether, diisopropyl ether, dibutyl ether, diisobutyl ether, di-n-amyl ether, diisoamyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, diheptadecyl ether, dioctadecyl ether, dinonadecyl ether, dieicosyl ether, methyl ethyl ether, methyl n-propyl ether, methyl isopropyl ether, methyl isobutyl ether, methyl tert-butyl ether, methyl n-amyl ether, methyl isoamyl ether, ethyl n-propyl ether, ethyl isopropyl ether, ethyl isobutyl ether, ethyl tert-butyl ether, ethyl n-amyl ether, ethyl isoamyl ether, divinyl ether, diallyl ether, methyl vinyl ether, methyl allyl ether, ethyl vinyl ether, ethyl allyl ether.

Further, specific examples of aromatic ethers (IV-2) are: anisole, phenetole, phenyl ether, benzyl ether, phenyl benzyl ether, α-naphthyl ether, β-naphthyl ether, polyphenyl ether, and perfluoroether. These examples may have a saturated or unsaturated group (in which the saturated or unsaturated group may be linear or branched, and the unsaturated bond may be in any desired position, and the number and the position of the substituents are not defined), and are preferably in liquid form under the service condition thereof, especially at room temperature.

Furthermore, cyclic ethers (IV-3) are those having from 2 to 40 carbon atoms, and are exemplified by ethylene oxide, propylene oxide, trimethylene oxide, tetrahydrofuran, tetrahydropyran, dioxane, glycidyl ether. They may have a saturated or unsaturated group, a carbon ring, or a saturated or unsaturated aliphatic group-having carbon ring (in which the saturated or unsaturated group may be linear or branched, and the unsaturated bond may be in any desired position, and the number and the position of the substituents are not defined).

The ketones (V) are oxygen-containing organic compounds represented by the following general formula (5):

$$R\text{---}(CO\text{---}R')_n \qquad (5)$$

and are exemplified by a compound having one or more carbonyl bonds.

Specific examples of the ketones (V) include: a saturated or unsaturated aliphatic ketone (V-1); a carbocyclic ketone (V-2); a heterocyclic ketone (V-3); a ketone alcohol (V-4); ketonic acid (V-5); and a mixture (V-6) of two or more selected from (V-1) to (V-5).

The saturated or unsaturated aliphatic ketone (V-1) is exemplified by those having 1 to 40 carbon atoms (in which the saturated or unsaturated aliphatic structure may be linear or branched, and the unsaturated bond may be in any desired position), such as acetone, methyl ethyl ketone, methyl propyl ketone, methyl isopropyl ketone, methyl butyl ketone, methyl isobutyl ketone, pinacolone, diethyl ketone, butyrone, diisopropyl ketone, methyl vinyl ketone, mesityl oxide and methyl heptenone.

Then, the carbocyclic ketone (V-2) is exemplified by those having 4 to 40 carbon atoms, such as cyclobutanone, cyclopentanone, cyclohexanone, acetophenone, propiophenone, butyrophenone, valerophenone, benzophenone, dibenzylketone and 2-acetonaphthone, which may have a saturated or unsaturated aliphatic group (that may be linear or branched, arbitrary in the position of an unsaturated bond and also arbitrary in the position and number of substitution).

Then, the heterocyclic ketone (V-3) is exemplified by those having 4 to 40 carbon atoms, such as 2-pyrrolidinone and caprolactam, which may have a saturated or unsaturated aliphatic group (that may be linear or branched, arbitrary in the position of an unsaturated bond and also arbitrary in the position and number of substitution).

Then, the ketone alcohol (ketol) (V-4) is exemplified by those having 3 to 40 carbon atoms, such as acetol, acetoin, acetoethyl alcohol, diacetone alcohol, phenacyl alcohol and benzoin, which may have a carbocyclic ring or a heterocyclic ring (heterocycle) or may have a carbocyclic ring or a heterocyclic ring having a saturated or unsaturated aliphatic group (that may be linear or branched, arbitrary in the position of an unsaturated bond and also arbitrary in the position and number of substitution).

Then, the ketonic acid (V-5) is exemplified by those having 1 to 40 carbon atoms, such as: an α-ketone acid including pyruvic acid, benzoylformic acid and phenylpyruvic acid; a β-ketone acid including acetoacetic acid, propionylacetic acid or benzoylacetic acid; and a γ-ketone acid including levulinic acid and β-benzoylpropionic acid.

The above-mentioned aldehydes (VI) are oxygen-containing organic compounds represented by the following general formula (6):

and are exemplified by a compound having one or more aldehyde groups.

Specific examples of the aldehydes (VI) include: a saturated or unsaturated aliphatic aldehyde (VI-1); a carbocyclic aldehyde (VI-2); a heterocyclic aldehyde (VI-3); and a mixture (VI-4) of two or more selected from (VI-1) to (VI-3).

The saturated or unsaturated aliphatic aldehyde (VI-1) is exemplified by those having 1 to 40 carbon atoms (in which saturated or unsaturated aliphatic structure may be linear or branched with an arbitrary position in an unsaturated bond) such as formaldehyde, acetaldehyde, propionaldehyde, butyl aldehyde, isobutyl aldehyde, valeric aldehyde, isovaleric aldehyde, pivalic aldehyde, caproic aldehyde, heptonic aldehyde, capryl aldehyde, peralgonic aldehyde, capric aldehyde, undecyl aldehyde, lauric aldehyde, tridecyl aldehyde, myristic aldehyde, pentadecyl aldehyde, palmitic aldehyde, margaric aldehyde, stearic aldehyde, acrolein, crotonic aldehyde, propiolic aldehyde, glyoxal and succinic aldehyde.

Then, the carbocyclic aldehyde (VI-2) is exemplified by those having 1 to 40 carbon atoms, such as benzaldehyde, o-toluic aldehyde, m-toluic aldehyde, p-toluic aldehyde, salicyl aldehyde, cinnamic aldehyde, α-naphthoic aldehyde and β-naphthoic aldehyde, which may have a saturated or unsaturated aliphatic group (that may be linear or branched, arbitrary in the position of an unsaturated bond and also arbitrary in the position and number of substitution).

Then, the heterocyclic aldehyde (VI-3) is exemplified by those having 1 to 40 carbon atoms, such as furfural, which may have a saturated or unsaturated aliphatic group (that may be linear or branched, arbitrary in the position of an unsaturated bond and also arbitrary in the position and number of substitution).

The above-mentioned carbonates (VII) are oxygen-containing organic compounds represented by the following general formula (7):

and are exemplified by a compound having one or more carbonate bonds.

The carbonates (VII) are exemplified by those with 1 to 40 carbon atoms having a saturated or unsaturated aliphatic group, a carbon-ring group, a carbon-ring group having a saturated or unsaturated aliphatic group, or a saturated or unsaturated aliphatic group having a carbon-ring group (in which the saturated or unsaturated aliphatic group being linear or branched, arbitrary in the position of an unsaturated bond and also arbitrary in the position and number of substitution), such as dimethyl carbonate, diethyl carbonate, di-n-propyl carbonate, diisopropyl carbonate, di-n-butyl carbonate, diisobutyl carbonate, di-tert-butyl carbonate, dipentyl carbonate, dihexyl carbonate, diheptyl carbonate, dioctyl carbonate, dinonyl carbonate, didecyl carbonate, diundecyl carbonate, didodecyl carbonate, ditridecyl carbonate, ditetradecyl carbonate, dipentadecyl carbonate, dihexadecyl carbonate, diheptadecyl carbonate, dioctadecyl carbonate, diphenyl carbonate, and a hydroxy(poly)oxyalkylene carbonate formed by adding an alkylene oxide to these carbonates.

Derivatives of the aforementioned oxygen-containing organic compounds (alcohols, carboxylic acids, esters, ethers, ketones, aldehydes and carbonates) are exemplified by a compound obtained by reacting the aforementioned oxygen-containing organic compound with a nitrogen-containing compound, a phosphorus-containing compound, sulfur or a sulfur-containing compound, a boron-containing compound, a halogen element or a halogen-containing compound, a metal element or a metal-containing compound (organic or inorganic), but are not limited to such examples.

The aforementioned compound used for obtaining the derivative is usually employed as an additive, but its effect is not particularly restricted even when employed as a base oil.

Meanwhile, R and R' in the general formula (1) to (7) each independently represents a hydrocarbon group such as an alkyl group, an alkenyl group, an alkylene group, a cycloalkyl group, an alkylcycloalkyl group, an aryl group, an alkylaryl group, and an arylalkyl group (which hydrocarbon group may further have one or more kinds of group or bond selected from a hydroxyl group, a carboxyl group, a carbonyl group, an ester bond and an ether bond, and may further contain an element other than carbon, hydrogen and oxygen, such as nitrogen, sulfur (e.g. a heterocyclic compound), a halogen (e.g. fluorine or chlorine), phosphorus, boron and a metal).

The hydrocarbon group is not particularly restricted in the number of carbon atoms, but preferably has 1 to 40, more preferably 2 to 30 and particularly preferably 3 to 20 carbon atoms.

In case that the oxygen-containing organic compound contains hydroxyl group and/or carboxyl group together with the above-mentioned hydrocarbon group, the content of hydroxyl group and/or carboxyl group is not particularly limited, but is preferably from 10 to 1000 ppm based on the total amount of the composition.

Examples of the alkyl group include an alkyl group having 1 to 40, preferably 2 to 30, much more preferably 3 to 20 carbon atoms, such as a methyl group, an ethyl group, an n-propyl group, an isopropyl group, an n-butyl group, an isobutyl group, a sec-butyl group, a tert-butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched hexadecyl group, a linear or branched heptadecyl group, a linear or branched octadecyl group, a linear or branched nonadecyl group, a linear or branched icosyl group, a linear or branched henicosyl group, a linear or branched docosyl group, a linear or branched tricosyl group, and a linear or branched tetracosyl group.

Examples of the alkenyl group include an alkenyl group having 2 to 40, preferably 2 to 30, much more preferably 3 to 20 carbon atoms, such as a vinyl group, a linear or branched propenyl group, a linear or branched butenyl group, a linear or branched pentenyl group, a linear or branched hexenyl group, a linear or branched heptenyl group, a linear or branched octenyl group, a linear or branched nonenyl group, a linear or branched decenyl group, a linear or branched undecenyl group, a linear or branched dodecenyl group, a linear or branched tridecenyl group, a linear or branched tetradecenyl group, a linear or branched pentadecenyl group, a linear or branched hexadecenyl group, a linear or branched heptadecenyl group, a linear or branched octadecenyl group, a linear or branched nonadecenyl group, a linear or branched icosenyl group, a linear or branched henicosenyl group, a linear or branched docosenyl group, a linear or branched tricosenyl group, and a linear or branched tetracosenyl group.

Examples of the cycloalkyl group include a cycloalkyl group having 3 to 40, preferably 3 to 20, much more preferably 5 to 8 carbon atoms, such as a cyclopentyl group, a cyclohexyl group, a cycloheptyl group and a cyclooctyl group.

Examples of the alkylcycloalkyl group include those having 4 to 40, preferably 5 to 20, much more preferably 6 to 12 carbon atoms, such as a methylcyclopentyl group, a dimethylcyclopentyl group (including all structural isomers), a methylethylcyclopentyl group (including all structural isomers), a diethylcyclopentyl group (including all structural isomers), a methyl cyclohexyl group, a dimethylcyclohexyl group (including all structural isomers), a methylethylcyclohexyl group (including all structural isomers) a diethylcyclohexyl group (including all structural isomers), a methylcycloheptyl group, a dimethylcycloheptyl group (including all structural isomers), a methylethylcycloheptyl group (including all structural isomers), and a diethylcycloheptyl group (including all structural isomers).

Examples of the aryl group include those having 6 to 20, preferably 6 to 10 carbon atoms, such as a phenyl group and a naphthyl group.

The above-mentioned alkylaryl group is an alkylaryl group having 7 to 40, more preferably 7 to 20, much more preferably 7 to 12 carbon atoms, and therefore is exemplified by: a mono-substituted phenyl group such as a tolyl group (including all structural isomers), an ethylphenyl group (including all structural isomers), a linear or branched propylphenyl group (including all structural isomers), a linear or branched butylphenyl group (including all structural isomers), a linear or branched pentylphenyl group (including all structural isomers), a linear or branched hexylphenyl group (including all structural isomers), a linear or branched heptylphenyl group (including all structural isomers), a linear or branched octylphenyl group (including all structural isomers), a linear or branched nonylphenyl group (including all structural isomers), a linear or branched decylphenyl group (including all structural isomers), a linear or branched undecylphenyl group (including all structural isomers), or a linear or branched dodecylphenyl group (including all structural isomers); and an aryl group having two or more alkyl groups each of which may linear or branched and same as or different from the other and includes a xylyl group (including all structural isomers), a diethylphenyl group, a dipropylphenyl group, a 2-methyl-6-tert-butylphenyl group, a 2,6-di-tert-butyl-4-methylphenyl group, a 2,6-di-tert-butyl-4-(3,5-di-tert-butyl-4-benzyl)phenyl group and the like (the alkyl group may further include an aryl group, an alkylaryl group, an arylalkyl group, and all structural isomers thereof).

Examples of the arylalkyl group include an arylalkyl group having 7 to 40, more preferably 7 to 20, much more preferably 7 to 12 carbon atoms, such as a benzyl group, a phenylethyl group, a phenylpropyl group (including isomers of propyl group), a phenylbutyl group (including isomers of butyl group), a phenylpentyl group (including isomers of pentyl group) and a phenylhexyl group (including isomers of hexyl group).

Derivatives of the above-mentioned oxygen-containing organic compounds can be used same as the oxygen-containing organic compounds. The derivatives are exemplified by: compounds prepared by sulfidizing or by halogenating (e.g. fluorinating and chlorinating) one selected from the above-mentioned alcohols, carboxylic acids, esters, ethers, ketones, aldehydes and carbonates; reaction products prepared by reacting acids such as sulfuric acid, nitric acid, boric acid, phosphoric acid, esters or metal salts of these acids with one selected from the above-mentioned alcohols, carboxylic acids, esters, ethers, ketones, aldehydes and carbonates; and its reaction products with metals, metal-containing compounds or amine compounds; and reaction products prepared by reacting metals, metal-containing compounds or amine compounds with one selected from the above-mentioned alcohols, carboxylic acids, esters, ethers, ketones, aldehydes and carbonates.

Of these derivatives, preferred are reaction products of one or more selected from alcohols, carboxylic acids and their derivatives, with amine compounds (e.g., Mannich reaction products, acylated products and amides).

The amine compounds include, for example, ammonia, monoamines, diamines and polyamines.

More concretely, the amine compounds are exemplified by: ammonia; alkylamines having an alkyl group with from 1 to 30 carbon atoms (in which the alkyl group may be linear or branched) such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, stearylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, methylethylamine, methylpropylamine, methylbutylamine, ethylpropylamine, ethylbutylamine, and propylbutylamine; alkenylamines having an alkenyl group with from 2 to 30 carbon atoms (in which the alkenyl group may be linear or branched) such as ethenylamine, propenylamine, butenylamine, octenylamine, and oleylamine; alkanolamines having an alkanol group with from 1 to 30 carbon atoms (in which the alnanol group may be linear or branched) such as methanolamine, ethanolamine, propanolamine, butanolamine, pentanolamine, hexanolamine, heptanolamine, octanolamine, nonanolamine, methanolethanolamine, methanolpropanolamine, methanolbutanolamine, ethanolpropanolamine, ethanolbutanolamine, and propanolbutanolamine; alkylenediamines having an alkylene group with from 1 to 30 carbon atoms, such as methylenediamine, ethylenediamine, propylenediamine, and butylenediamine; polyamines such as diethylenetriamine, triethylenetetramine, tetraethylenepentamine, pentaethylenehexamine; compounds derived from the above-mentioned monoamines, diamines or polyamines and having an alkyl or alkenyl group with from 8 to 20 carbon atoms, such as undecyldiethylamine, undecyldiethanolamine, dodecyldipropanolamine, oleyldiethanolamine, oleylpropylenediamine, stearyltetraethylenepentamine; heterocyclic compounds such as N-hydroxyethyloleylimidazoline; alkylene oxide adducts of these compounds; and their mixtures.

Of those nitrogen-containing compounds, preferred are aliphatic amines having an alkyl or alkenyl group with from 10 to 20 carbon atoms (the aliphatic amines may be linear or branched) such as decylamine, dodecylamine, tridecylamine, heptadecylamine, octadecylamine, oleylamine and stearylamine.

Of the derivatives of these oxygen-containing organic compounds, preferred are carboxylic amides having from 8 to 20 carbon atoms, such as oleamide.

A content of the organic oxygen-containing compound is not particularly restricted, but is preferably not less than 0.001%, more preferably not less than 0.05%, much more preferably not less than 0.1%, and may exceed 3.0%, while preferably not more than 50%, more preferably not more than 20%, further preferably not more than 10%, and still further preferably not more than 5%. The oxygen-containing organic compound can exhibit an excellent low-friction property even at an addition of a small amount, for example, about 0.1 to 2%.

Additionally, one or more additives selected from a viscosity index improver, a pour-point depressant, an abrasion preventing agent, an extreme pressure agent, a friction modifier, a cleaning dispersant (or detergent dispersant), an antioxidant, an antirusting agent, a metal deactivator, a surfactant, an anti emulsification agent, a seal swell agent, a thickener, an adhesive, a solid lubricant, a structure stabilizer, a defoaming agent and a coloring agent, can be blended as necessary.

The viscosity index improver can be exemplified by: non-dispersion type viscosity index improvers such as copolymers of one or two monomers selected from various methacrylic acids, and hydrides of the copolymers; dispersion type viscosity index improvers such as copolymers of various methacrylates (including nitrogen compounds); non-dispersion or dispersion type copolymers of ethylene and α-olefins (such as propylene, 1-butene and 1-pentene) and hydrides thereof; polyisobutylenes and hydrides thereof; a hydrogenated copolymer of styrene and diene; a copolymer of styrene and maleic anhydride ester; and polyalkylstyrenes.

The viscosity index improver is required to have a molecular weight selected in view of shear stability. An average molecular weight of the viscosity index improver is: preferably from 5,000 to 1,000,000, more preferably from 100,000 to 800,000 when the dispersion or non-dispersion type polymethacrylates are employed as the viscosity index improver; preferably from 800 to 5,000 when polyisobutylenes or hydrides thereof are employed as the same; and preferably from 800 to 300,000, more preferably from 10,000 to 200,000 when ethylene/α-olefin copolymers and hydrides thereof are employed as the same. The above viscosity index improvers can be used singly or in combination, and generally the content thereof is preferably from 0.1 to 40.0% based on the total mass of the lubricating oil.

In the lubricating oil according to the present invention, it is particularly preferable to use the polymethacrylate-based viscosity index improver in view of maintaining the low-friction property.

The diamond nano-particles are singles crystals having an average particle size of about 5 nm and are prepared by the following sequential steps of: retrieving carbonaceous medium from negative oxygen balance explosives such as trinitrotoluene and hexogen by exploding them; removing foreign substances therefrom; making a chemical oxidation treatment with nitric acid, sulfuric acid, potassium permanganate or the like; and carrying out pulverization in a ball mill.

A content of the diamond nano-particles is within a range of from 0.01 to 3.0%, preferably from 0.05 to 1.0%, more preferably from 0.05 to 0.15% based on the total mass of the lubricant composition.

When a content of the nanodiamond particles is less than 0.01% or exceeds 3.0%, the lubricant composition cannot produce a fuel consumption-saving effect.

The dispersant for the diamond nano-particles is required only to disperse the diamond nano-particles in oil so as not to be particularly limited, but preferably a nonionic surfactant which exhibits surface activity and never affects the lubricant composition.

Specific examples of the dispersant for the diamond nano-particles include polyoxyethylene alkyl ethers, polyoxyethylene dialkylphenol ethers, alkylglycoside, polyoxyethylene fatty acid esters, sucrose fatty acid esters, sorbitan fatty acid esters, polyoxyethylene sorbitan fatty acid esters, fatty acid alkanolamide.

Of these dispersant, preferred are those containing polyoxyethylene alkyl ethers and polyoxyethylene alkyl ether phosphate, and more preferred is a dispersant for the diamond nano-particles, containing polyoxyethylene alkyl ethers of 5 to 15% and polyoxyethylene alkyl ether phosphate of 85 to 95%.

Also preferred are those containing polyoxyethylene dialkyl phenyl ethers and polyoxyethylene dialkyl phenyl ether phosphate, and more preferred is a dispersant for the diamond nano-particles, containing polyoxyethylene dialkyl phenyl ethers of 10 to 15% and polyoxyethylene dialkyl phenyl ether phosphate of 85 to 90%.

Particularly preferred is a dispersant for the diamond nano-particles, formed of sorbitan trioleate.

The lubricant composition according to the present invention has the effect of fuel economy performance when supplied to a system (of lubricant composition-closed or lubricant composition-circulated type or the like).

The lubricant composition according to the present invention is applicable to a system where opposite members are relatively moved to each other to form a contact surface: such as an internal combustion engine of 4 stroke cycle or 2 stroke cycle type, more specifically such as a part in a valve driving system, a piston, a piston ring, a piston skirt section, a cylinder liner section, a connecting rod, a crank shaft, a bearing, a bearing metal, a gear, a chain, a belt, an oil pump; a part in a drive transmission system such as gears and a joint; a sliding part in a hard disc drive (HDD) system; and other various systems having the contact surface subjected to a severe frictional condition and required to have a low friction.

EXAMPLES

The present invention will be more readily understood with reference to the following Examples; however, these Examples are intended to illustrate the invention and are not to be construed to limit the scope of the invention.

Example 1

A lubricant composition of Example 1 was prepared such that poly-α-olefin serving as a base oil for a lubricating oil contains: 1% of GMO (glycerin monooleate); 0.01% of diamond nano-particles having an average particle size of 5 nm; 1% of a nonionic surfactant serving as a dispersant for the diamond nano-particles and consisting of 5% of polyoxyethylene alkyl ether and 95% of polyoxyetylene alkyl ether phosphate. A part of the specification is shown in Table 1.

"Dispersibility" as shown in Table 1 means results obtained in such a manner as to evaluate the diamond nano-particles by its appearance in terms of its dispersibility, in which "A", "B" and "C" represent a result where the diamond nano-particles completely dissolve or disperse (so that the solution was not whitish), a result where the diamond nano-particles dissolve or disperse to some extent (so that the solution was whitish), and a result where the diamond nano-particles do not dissolve or disperse (so that the solution was whitish and the diamond nano-particles precipitate), respectively.

Examples 2 to 7 and Comparative Examples 1 to 4

A procedure of Example 1 was repeated with the exception that the dispersant was modified to have a composition and type as shown in Table 1, thereby obtaining a lubricant composition of each example.

obtained specimen was set on the SRV friction tester, and then the lubricant composition of each example was dropped on the specimen. Then, the friction test was carried out with the following test conditions.

(Test Condition)

| Temperature: | 80° C. |
| Load: | 400N |
| Amplitude: | 3 mm |
| Frequency: | 50 Hz |

Thereafter, a friction coefficient that the specimen had during 10 to 20 minutes after the beginning of the test was measured. The specimen was most stable during this time period in terms of a friction coefficient, so that the evaluation of the specimen was made with the friction coefficient. Results are shown also in Table 1.

In measurement of the friction coefficient, there was not used a lubricant composition until 1 week after the diamond nano-particles were added to and stirred in the lubricant composition.

As apparent from Table 1, all lubricant compositions of Examples 1 to 7 according to the present invention were reduced in friction coefficient and exhibited a stable friction reducing effect.

It seems that lubricant compositions of Comparative Examples 1 to 4 in which the diamond nano-particles are not dispersed make wear or seizing easy to occur to the sliding part the specimen has.

Further, it is also found that a polymeric dispersant for dispersing a pigment or carbon black makes difficult to disperse the diamond nano-particles.

Furthermore, at the present time, the lubricant composition of Examples 1, 2, 3, 4 and 7 seem to achieve the best results

TABLE 1

|  | Dispersant for Diamond Nano-particles | | Dispersibility | Friction Coefficient |
| --- | --- | --- | --- | --- |
|  | Type | Composition | | |
| Example 1 | Nonionic Surfactant | 5% of polyoxyethylene alkyl ether<br>95% of polyoxyetylene alkyl ether phosphate | A | 0.04 |
| Example 2 | Nonionic Surfactant | 15% of polyoxyethylene alkyl ether<br>85% of polyoxyetylene alkyl ether phosphate | A | 0.05 |
| Example 3 | Nonionic Surfactant | 10% of polyoxyethylene dialkyl phenyl ether<br>90% of polyoxyetylene dialkyl phenyl ether phosphate | A | 0.06 |
| Example 4 | Nonionic Surfactant | 15% of polyoxyethylene dialkyl phenyl ether<br>85% of polyoxyetylene dialkyl phenyl ether phosphate | A | 0.06 |
| Example 5 | Nonionic Surfactant | Sorbitan monooleate | B | 0.09 |
| Example 6 | Nonionic Surfactant | Sorbitan dioleate | B | 0.09 |
| Example 7 | Nonionic Surfactant | Sorbitan trioleate | A | 0.05 |
| Comparative Example 1 | Polymeric Dispersant | Polymer having polyoxyalkylene group | C | 0.14 |
| Comparative Example 2 | Polymeric Dispersant | High molecular weight alkylol aminoamide | C | 0.15 |
| Comparative Example 3 | Polymeric Dispersant | Acryl-based copolymer | C | 0.15 |
| Comparative Example 4 | Polymeric Dispersant | High molecular weight copolymer | C | 0.14 |

[Performance Evaluation]
(SRV Friction Test)

A specimen for a SRV friction tester (available from OPTIMOL) was prepared as an example formed with a surface with which a low-frictional motion system is contacted, such that a heat treated SUJ2 material (according to JIS G 4805) was formed into a disc shape or cylindrical shape by grinding and then finished by polishing with a lapping tape to have a certain surface roughness (Ra=0.2 μm or less). The thus in view of improving an ability of metal to adsorb the diamond nano-particles on the surface of the metal.

According to the present invention, the lubricant composition was prepared by adding the oxygen-containing organic compound, a certain amount of diamond nano-particles and the dispersant for the diamond nano-particles to the lubricating oil base oil, so as to achieve a significant reduction of friction coefficient and a further improvement in fuel economy.

The entire contents of Japanese Patent Applications P2007-015796 (filed Jan. 26, 2007) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A lubricant composition for an automotive vehicle, comprising:
   a base oil for a lubricating oil, wherein the base oil is suitable for use in an automotive vehicle;
   an oxygen-containing organic compound which is constituted of carbon, hydrogen and oxygen and has a hydroxyl group;
   a diamond nano-particle; and
   a dispersant for the diamond nano-particle, wherein the dispersant is different from the oxygen-containing organic compound, and wherein the dispersant is selected from the group consisting of:
   a dispersant containing polyoxyethylene alkyl ether within a range of from 5 to 15 mass % and polyoxyethylene alkyl ether phosphate within a range of from 85 to 95 mass
   a dispersant containing polyoxyethylene dialkyl phenyl ether within a range of from 10 to 15 mass % and polyoxyethylene dialkyl phenyl ether phosphate within a range of from 85 to 90 mass %,
   a dispersant containing sorbitan monooleate,
   a dispersant containing sorbitan dioleate, and
   a dispersant containing sorbitan trioleate.

2. A lubricant composition for an automotive vehicle, as claimed in claim 1, wherein a content of the diamond nano-particle is within a range of from 0.01 to 3.0 mass %.

3. A lubricant composition for an automotive vehicle, as claimed in claim 1, wherein the dispersant for the diamond nano-particle is the dispersant containing polyoxyethylene alkyl ether within a range of from 5 to 15 mass % and polyoxyethylene alkyl ether phosphate within a range of from 85 to 95 mass %.

4. A lubricant composition for an automotive vehicle, as claimed in claim 1, wherein the dispersant for the diamond nano-particle is the dispersant containing polyoxyethylene dialkyl phenyl ether within a range of from 10 to 15 mass % and polyoxyethylene dialkyl phenyl ether phosphate within a range of from 85 to 90 mass %.

5. A lubricant composition as claimed in claim 1, wherein the dispersant for the diamond nano-particle is the dispersant containing sorbitan trioleate.

6. A lubricant composition for an automotive vehicle, as claimed in claim 1, wherein the base oil for the lubricating oil has a kinematic viscosity of not less than 2 $mm^2$/s and not more than 20 $mm^2$/s at 100° C.

7. A lubricant composition for an automotive vehicle, as claimed in claim 1, wherein the base oil for the lubricating oil has a kinematic viscosity of not less than 3 $mm^2$/s at 100° C.

8. A lubricant composition for an automotive vehicle, as claimed in claim 1, wherein the base oil for the lubricating oil has a kinematic viscosity of not more than 10 $mm^2$/s at 100° C.

9. A lubricant composition for an automotive vehicle, as claimed in claim 1, wherein the base oil for the lubricating oil has a kinematic viscosity of not more than 8 $mm^2$/s at 100° C.

10. A lubricant composition for an automotive vehicle, as claimed in claim 1, wherein the base oil for the lubricating oil has a viscosity index of not less than 80.

11. A lubricant composition for an automotive vehicle, as claimed in claim 1, wherein the base oil for the lubricating oil has a viscosity index of not less than 100.

12. A lubricant composition for an automotive vehicle, as claimed in claim 1, wherein the base oil for the lubricating oil has a viscosity index of not less than 120.

13. A lubricant composition for an automotive vehicle, as claimed in claim 1, wherein the lubricant composition is supplied to a system of lubricant composition-closed type or of lubricant composition-circulated type.

14. A lubricant composition for an automotive vehicle, as claimed in claim 1, wherein the oxygen-containing organic compound is glycerin monooleate (GMO).

15. A lubricant composition as claimed in claim 1, wherein the dispersant for the diamond nano-particle is the dispersant containing sorbitan monooleate.

16. A lubricant composition as claimed in claim 1, wherein the dispersant for the diamond nano-particle is the dispersant containing sorbitan dioleate.

* * * * *